United States Patent
Burghard et al.

(10) Patent No.: US 11,621,619 B2
(45) Date of Patent: Apr. 4, 2023

(54) INSULATING A COIL WINDING OF AN ACTIVE PART OF AN ELECTRICAL MACHINE

(71) Applicant: Siemens Aktiengesellschaft, Munich (DE)

(72) Inventors: Matthias Johannes Burghard, Berlin (DE); Marco Festa, Falkensee (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/767,326

(22) PCT Filed: Aug. 21, 2020

(86) PCT No.: PCT/EP2020/073530
§ 371 (c)(1),
(2) Date: Apr. 7, 2022

(87) PCT Pub. No.: WO2021/069138
PCT Pub. Date: Apr. 15, 2021

(65) Prior Publication Data
US 2022/0352797 A1 Nov. 3, 2022

(30) Foreign Application Priority Data
Oct. 11, 2019 (EP) .................................. 19202757

(51) Int. Cl.
*H02K 15/12* (2006.01)
*H02K 15/10* (2006.01)

(52) U.S. Cl.
CPC .......... *H02K 15/12* (2013.01); *H02K 15/105* (2013.01); *Y10T 29/49009* (2015.01)

(58) Field of Classification Search
CPC .......... H02K 15/12; H02K 3/30; H01B 3/308; H01F 27/323; Y10T 428/2933; Y10T 29/49009

(Continued)

(56) References Cited

U.S. PATENT DOCUMENTS

| 4,751,488 A * | 6/1988 | Lanoue | H01B 3/308 336/84 R |
| 2007/0188289 A1 | 8/2007 | Kumano et al. | |
| 2009/0015094 A1* | 1/2009 | Yoshitake | H02K 15/12 310/257 |

FOREIGN PATENT DOCUMENTS

| GB | 654637 A | 6/1951 |
| JP | S4811843 B1 | 4/1973 |

(Continued)

OTHER PUBLICATIONS

PCT International Examination Report and Written Opinion of International Examination Authority dated Oct. 15, 2020 corresponding to PCT International Application No. PCT/EP2020/073530 filed Aug. 21, 2020.

*Primary Examiner* — Thiem D Phan
(74) *Attorney, Agent, or Firm* — Henry M. Feiereisen LLC

(57) ABSTRACT

In a method for insulating a coil winding of an active part of a rotating electric machine, the active part is impregnated with an insulating resin in a tub-like impregnation container by vacuum pressure impregnation. The active part is held in the impregnation container, after impregnation with the insulating resin, completely submerged in the insulating resin. The impregnation container together with the active part is introduced into a baking oven, and the active part is set in the insulating resin in rotation about a longitudinal axis of the active part. While the active part is rotating, the insulating resin is purged from the impregnation container (Continued)

and then the oven temperature is increased to a predetermined baking temperature which is maintained for a predetermined baking period. Rotation of the active part is terminated after expiration of the baking period.

12 Claims, 3 Drawing Sheets

(58) Field of Classification Search
USPC ....... 29/596, 598, 602.1, 729, 732, 734, 887
See application file for complete search history.

(56) References Cited

FOREIGN PATENT DOCUMENTS

| JP | S5631356 A | 3/1981 |
|----|------------|--------|
| JP | 2265907 C2 | 12/2005 |

\* cited by examiner

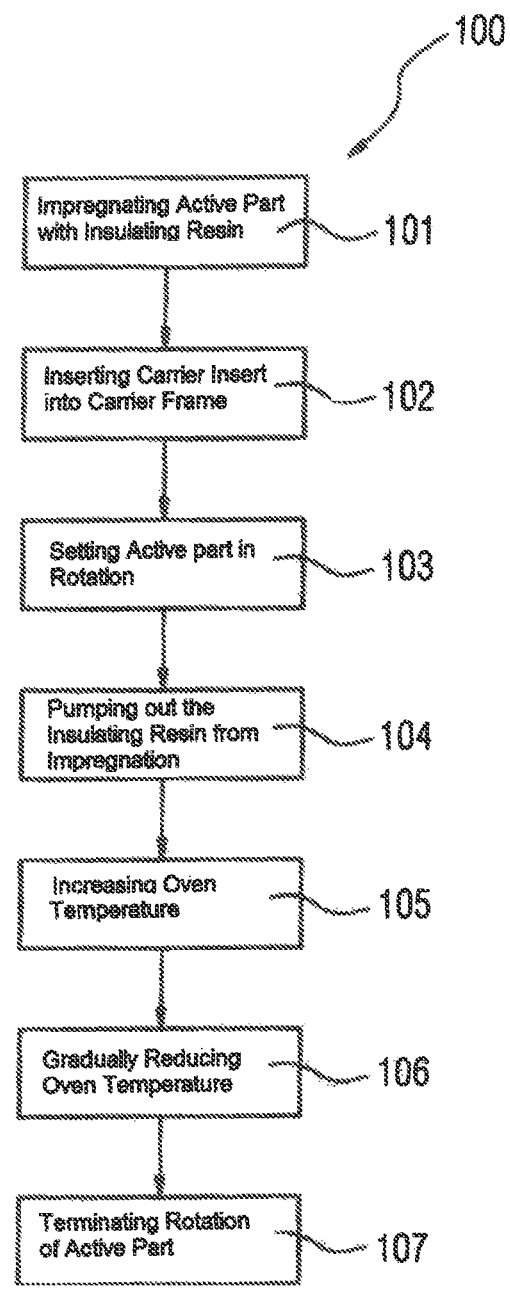

INSULATING A COIL WINDING OF AN ACTIVE PART OF AN ELECTRICAL MACHINE

CROSS-REFERENCES TO RELATED APPLICATIONS

This application is the U.S. National Stage of International Application No. PCT/EP2020/073530, filed Aug. 21, 2020, which designated the United States and has been published as International Publication No. WO 2021/069138 A1 and which claims the priority of European Patent Application, Serial No. 19202757.1, filed Oct. 11, 2019, pursuant to 35 U.S.C, 119(a)-(d).

BACKGROUND OF THE INVENTION

The Invention relates to a method for insulating a coil winding of an active part (in other words a stator or a rotor) of a rotating electric machine and an apparatus for implementing the method.

More precisely, the invention relates to insulating a coil winding of an active part of a rotating electric machine in which the coil winding is impregnated with an insulating resin by so-called vacuum pressure impregnation (VPI). In the case of vacuum pressure impregnation, the active part is initially degassed in a vacuum and is subsequently submerged in the insulating resin. Finally, the insulating resin and the active part that is submerged in the insulating resin is exposed to an excess pressure in order to press the insulating resin into the evacuated hollow spaces of the active part that are hitherto not yet filled with insulating resin. In this case, it is necessary to prevent a large quantity of insulating resin from leaking out of the active part after the impregnation. A leakage of the resin on the one hand has the disadvantage of producing poorer insulation values, on the other hand however nevertheless a more substantial disadvantage of producing an insulation that can be easily damaged or destroyed in the case of a sudden decompression. Damage of this type can occur on account of cavities in the insulation, in other words on account of closed hollow spaces, which occur on account of the leaking resin and during operation of the electric machine under high process gas pressure that the machine is exposed to, gas diffuses into said hollow spaces and this high process gas pressure consequently prevails in said hollows spaces. In the case of a rapid drop in pressure in the surroundings of the electric machine, the gas that is diffused into the cavities does not escape rapidly enough with the result that an excess pressure occurs in the cavities on account of the gas that remains in the cavities, and said excess pressure leads to the insulation breaking up or to a delamination.

In the case of specific resins, it is possible using a so-called accelerant to reduce a leakage of the insulating resin after impregnation, wherein said insulating resin is a material that is introduced into the coil winding that is to be impregnated and during the impregnation process allows the insulating resin to gel and consequently prevents leakage. However, an accelerant of this type cannot be used in the case of all insulating resins, in particular not in the case of specific resins that are required for the insulation of windings of specific rapidly running electric machines and that must be resistant in the case of cooling by process gas under high pressure.

The object of the invention is to provide an improved method using vacuum pressure impregnation for insulating a coil winding of an active part of a rotating electric machine and to provide an apparatus for implementing the method.

SUMMARY OF THE INVENTION

The object is achieved in accordance with the invention by a method as set forth hereinafter, and by an apparatus as set forth hereinafter.

Advantageous embodiments of the invention are the subject matter of the dependent claims.

In the case of the method in accordance with the invention for insulating a coil winding of an active part of a rotating electric machine, the active part is Initially Impregnated with an insulating resin in a tub-like impregnation container by vacuum pressure impregnation. The impregnation container that is still filled with insulating resin together with the active part that is arranged in said impregnation container is subsequently introduced into a baking oven and the active part is set in rotation about a longitudinal axis of the active part. While the active part is rotating, the insulating resin is purged from the impregnation container and afterward the oven temperature is increased to a predetermined baking temperature and is maintained at the baking temperature for a predetermined baking period. The rotation of the active part is only terminated after the expiration of the baking period.

In the case of the method in accordance with the invention, a leakage of the insulating resin from the active part is considerably reduced after the vacuum pressure impregnation in that the active part is set in rotation and said rotation is maintained during the curing of the insulating resin. It is particularly advantageous in this case that the active part is already set in rotation while said active part is still submerged in the insulating resin and the rotation is maintained while the impregnation container is drained of the insulating resin and during the baking in the baking oven. As a consequence, it is in particular prevented that between the draining of the insulating resin and the start of the baking, a time elapses in which the active part does not rotate and in which accordingly more insulating resin can leak because the active part for example is transported after the draining of the insulating resin first to the baking oven, is then positioned in the baking oven and finally must be connected to the rotation drive.

In the case of one embodiment of the method in accordance with the invention, the active part is set in rotation in the impregnation container by a chain drive. In particular, it can be provided that the active part is held in the impregnation container by two chains and the active part is fixed to an active part carrier via said chains and said active part is set in rotation via at least one of the two chains. This embodiment of the method in accordance with the invention takes into consideration that the active part in accordance with the invention is still submerged in the insulating resin at the start of the rotation. A chain drive is adapted to this aspect of the invention since said chain drive provides a simple transmission of a drive torque to the active part by a chain that moreover can be replaced in a cost-effective manner in the event of a contamination by the insulating resin. Moreover, this embodiment of the method in accordance with the invention renders it possible to simultaneously expediently fix the active part to an active part carrier via chains in order to hold the active part in the impregnation container during the vacuum pressure impregnation and the subsequent rotation of the active part.

In the case of a further embodiment of the method in accordance with the invention, prior to the introduction of the impregnation container that is filled with the insulating resin and the active part that is arranged in the impregnation container the baking oven is preheated to a preheating temperature that is lower than the baking temperature. As a consequence, it is possible for the baking oven to be advantageously preheated to a temperature at which the insulating resin has a viscosity that is suitable for the discharge of the insulating resin.

In the case of a further embodiment of the method in accordance with the invention, after the expiration of the baking period in accordance with a predetermined temperature reduction curve the oven temperature is reduced to an end temperature. In this case, it can be provided that the rotation of the active part is only terminated after the oven temperature has reached the end temperature. This embodiment of the method in accordance with the invention renders possible a uniform and controlled cooling of the active part and the insulating resin on the coil winding in order to prevent stresses in the insulating resin that are caused by temperature differences and that can damage the insulation.

An apparatus in accordance with the invention for implementing the method in accordance with the invention comprises an impregnation container that is configured so as to receive the active part and to be filled with the insulating resin until the active part is completely submerged in the insulating resin, at least one first chain wheel, which can be connected to the active part, and an active part carrier that is configured so as to hold the active part in the impregnation container and that has a second chain wheel for each first chain wheel and said second chain wheel can be connected to the first chain wheel via a chain, wherein at least one second chain wheel can be driven by a drive in order to set the active part in rotation about its longitudinal axis. An apparatus in accordance with the invention renders it possible to implement the method in accordance with the invention with the advantages already mentioned above.

In the case of one embodiment of the apparatus in accordance with the invention, each first chain wheel can be connected to the active part in a detachable manner via at least one connecting element. As a consequence, a first chain wheel can advantageously be used multiple times in order to insulate coil windings of active parts.

A further embodiment of the apparatus in accordance with the invention provides two first chain wheels that can be connected to the active part on sides of the active part that lie opposite one another along the longitudinal axis of the active part and the active part can be fixed to the active part carrier with in each case a chain via said first chain wheels in order to hold the active part in the impregnation container. In this case, it can be provided that a spacing of the two second chain wheels can be adjusted. This renders it possible for the active part to be fixed as is already mentioned above to the active part carrier by two chains. An ability to adjust the spacing of the two second chain wheels moreover advantageously renders it possible to adapt the spacing of the second chain wheels to the spacing of the first chain wheels or to the axial expansion of the active part and consequently to use the apparatus in accordance with the invention for active parts of different axial expansions.

In the case of a further embodiment of the apparatus in accordance with the invention, the impregnation container has a container base having a drainage channel that issues into a container opening that can be closed by a shut-off valve. As a consequence, in particular the discharge of the insulating resin from the impregnation container is advantageously facilitated.

A further embodiment of the apparatus in accordance with the invention provides a carrier insert that has walls, which are arranged in a lattice-like manner, and said carrier insert can be arranged on the active part carrier in such a manner that the walls protrude into the insulating resin above the active part if the active part is submerged in the insulating resin in the impregnation container. As a consequence, it is advantageously possible to reduce a build up of the insulating resin in the impregnation container, in particular while transporting the impregnation container that is filled with the insulating resin into the baking oven.

BRIEF DESCRIPTION OF THE DRAWING

The above-described characteristics, features and advantages of this invention and also the manner in which these are achieved become clearer and more explicitly understandable in conjunction with the following description of exemplary embodiments that are further explained in conjunction with the drawings. In the drawings:

FIG. 3 shows a flow chart of an exemplary embodiment of the method in accordance with the invention for insulating a coil winding of an active part.

DETAILED DESCRIPTION OF PREFERRED EMBODIMENTS

Figure 1:
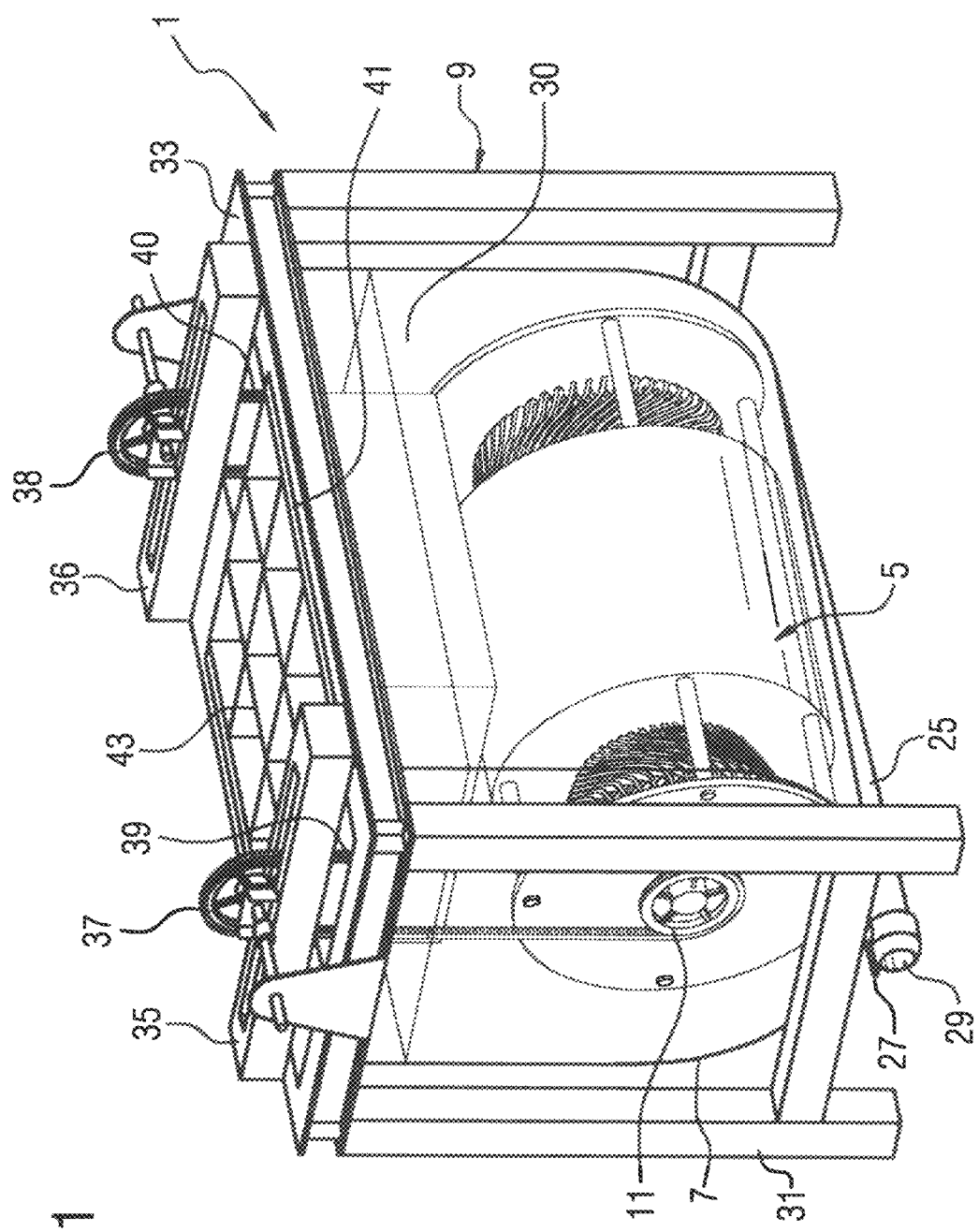
FIG. 1 shows a perspective view of an exemplary embodiment of an apparatus in accordance with the invention for insulating a coil winding of an active part with the active part arranged thereon or therein.

Parts that correspond to one another are provided with the same reference numerals in the figures.

FIG. 1 illustrates a perspective view of an exemplary embodiment of an apparatus 1 in accordance with the invention for insulating a coil winding 3 of an active part 5 of a rotating electric machine. The apparatus 1 comprises an impregnation container 7, an active part carrier 9 and two first chain wheels 11, 12.

Figure 2:
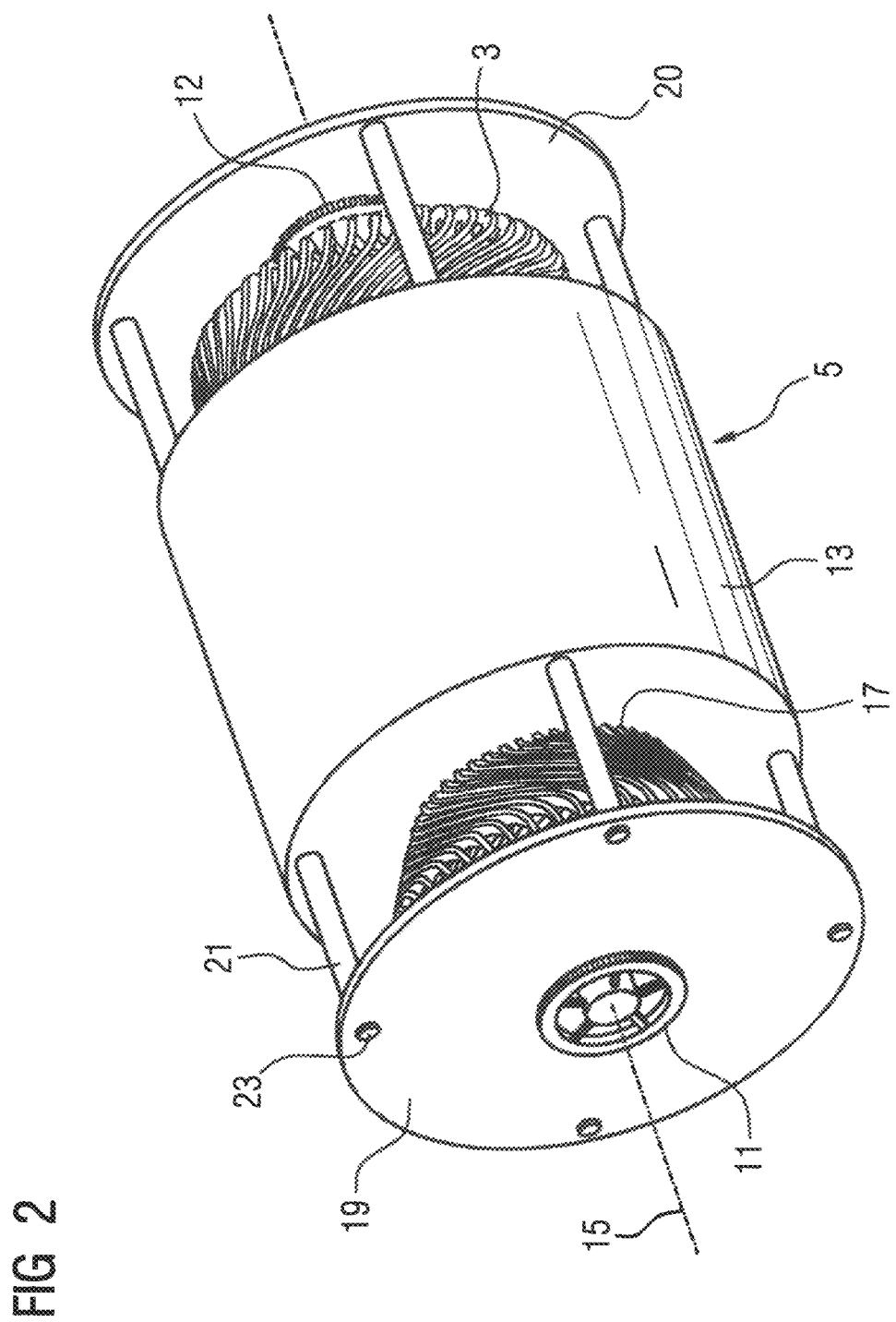
FIG. 2 shows a perspective view of the active part that is illustrated in FIG. 1 and first chain wheels that are connected to the active part.

FIG. 2 illustrates a perspective view of the active part 5 that is illustrated in FIG. 1 and the first chain wheels 11, 12 that are connected to the active part 5.

The active part 5 has a laminated core 13 that extends in an annular manner around the longitudinal axis 15 of the active part 5. The longitudinal axis 15 defines an axial direction. The laminated core 13 has grooves 17 that extend axially and straight sections of the coil winding 3 extend through said grooves and said straight sections of the coil winding are connected to coils on the two axial ends of the laminated core 13 by means of in each case a winding head of the coil winding 3. The grooves 17 are closed by groove breech wedges (not illustrated).

The first chain wheels 11, 12 are arranged on sides of the active part 5 that lie axially opposite one another and extend in each case around the longitudinal axis 15. Each first chain wheel 11, 12 is fixedly arranged on a carrier disc 19, 20 that is connected to the laminated core 13 by connecting elements 21 that are designed as connecting rods. The carrier discs 19, 20 are connected by screw connections 23 in a detachable manner to the connecting elements 21.

The impregnation container 7 is provided in a tub-shaped manner and has a container base having a drainage channel 25. The drainage channel 25 issues into a container opening 29, which can be closed by a shutoff valve 27, at the deepest point of the impregnation container 7. The impregnation container 7 is filled with an insulating resin 30 with the result that the active part 5 is completely submerged in the insulating resin 30.

The active part carrier 9 comprises a carrier frame 33 that is arranged on carrier legs 31. Two carrier beams 35, 36 are arranged on the carrier frame 33 and a second chain wheel 37, 38 is arranged in each case on said carrier beams. Each second chain wheel 37, 38 is connected via a chain 39, 40 to a first chain wheel 11, 12. The carrier beams 35, 36 can be fastened to various positions on the carrier frame 33 with the result that the spacing of the second chain wheels 37, 38 can be adapted to the spacing of the first chain wheels 11, 12 or the axial expansion of the active part 5.

A carrier insert 41 is inserted into the active part carrier 9 and said carrier insert has walls 43 that are arranged in a lattice-like manner. The walls 43 protrude into the insulating resin 30 above the active part 5.

The active part 5 is fixed using the chains 39, 40 to the active part carrier 9. At least one second chain wheel 37, 38 can be driven by a drive (not illustrated) in order to set the active part 5 in rotation about the longitudinal axis 15.

FIG. 3 illustrates a flow chart 100 of an exemplary embodiment of the method in accordance with the invention having method steps 101 to 107 for insulating the coil winding 3 of the active part 5 using an apparatus 1 that is illustrated in FIG. 1.

In a first method step 101, the active part 5 is impregnated with the insulating resin 30 in the impregnation container 7 by vacuum pressure impregnation. For this purpose, the carrier discs 19, 20 are fastened to the connecting elements 21 on the active part 5. The active part carrier 9 is lifted, for example using a crane, over the active part 5 until each first chain wheel 11, 12 can be clipped into a chain 39, 40 that is fixed to a second chain wheel 37, 38. After clipping in the first chain wheels 11, 12, the active part carrier 9 is lifted with the active part 5 that is fixed to said active part carrier and is lowered over the impregnation container 7 with the result that the active part 5 is held by the active part carrier 9 in the impregnation container 7. The impregnation container 7 and the active part carrier 9 are subsequently connected to one another for example by screw connections. The impregnation container 7 and the active part carrier 9 having the active part 5 that is fixed to said active part carrier are then moved into a pressure vessel. The pressure vessel is closed and evacuated and the active part is degassed for a predetermined degassing period in the evacuated pressure vessel. The insulating resin 30 is simultaneously heated to a preheating temperature, for example to approximately 70° C. The heated insulating resin 30 is subsequently pumped in the evacuated pressure vessel through the container opening 29 into the impregnation container 7 until the fill level of the insulating resin 30 reaches a predetermined value in the impregnation container 7 at which the active part 5 is completely submerged in the insulating resin 30. The active part 5 is then impregnated with the insulating resin 30 for an impregnation period. The pressure in the pressure vessel is subsequently increased to an excess pressure for an excess pressure period and is subsequently reduced back to normal pressure.

In a second method step 102, initially the carrier insert 41 is inserted into the carrier frame 33. The impregnation container 7, which is still filled with the insulating resin 30, and the active part carrier 9 having the active part 5 that is fixed to said active part carrier in the insulating resin 30 is subsequently introduced into a baking oven that is preheated to the preheating temperature.

In a third method step 103, the active part 5 in the insulating resin 30 is set in rotation about the longitudinal axis 15, for example in a rotation having an angular speed of approximately three rotations per minute in that at least one second chain wheel 37, 38 is driven by the drive for example via a cardan shaft.

In a fourth method step 104, the insulating resin 30 is pumped out of the impregnation container 7 while the active part 5 is still maintained in rotation. Optionally, after pumping the insulating resin 30 a large collection tray is pushed under the open container opening 29 in order to collect running insulating resin 30 that drops for example from the active part 5 and to distribute said insulating resin over a large area in order to prevent a self-Ignition of the insulating resin 30 while baking in a fifth method step 105.

In the fifth method step 105, the oven temperature is increased to a predetermined baking temperature, for example to approximately 170° C. and is maintained at the baking temperature for a predetermined baking period, for example for approximately eight hours.

In a sixth method step 106, the oven temperature is gradually reduced in accordance with a predetermined temperature reduction curve to an end temperature.

In a seventh method step 107, the rotation of the active part 5 is terminated after the oven temperature has reached the end temperature. The cooled apparatus 1 is subsequently dismantled and all the components of the apparatus 1 that have come into contact with the insulating resin 30 (the impregnation container 7, the chain wheels 11, 12, 37, 38, the chains 39, 40, the carrier discs 19, 20 and the carrier insert 41) are checked and where applicable cleaned or replaced.

Although the invention has been further illustrated and described in detail by preferred exemplary embodiments, the invention is not limited in this manner by the disclosed examples and other variations can be derived therefrom by the person skilled in the art without departing from the protective scope of the invention.

The invention claimed is:

1. A method for insulating a coil winding of an active pad of a rotating electric machine, said method comprising:
   impregnating the active part with an insulating resin in a tub-like impregnation container by vacuum pressure impregnation;
   holding the active part in the impregnation container, after impregnation with the insulating resin, completely submerged in the insulating resin;
   introducing the impregnation container together with the active part into a baking oven;
   setting the active part in the insulating resin in rotation about a longitudinal axis of the active part;
   purging the insulating resin from the impregnation container while the active part is rotating;
   subsequently increasing an oven temperature to a predetermined baking temperature and maintaining the baking temperature for a predetermined baking period; and
   terminating rotation of the active part after expiration of the baking period.

2. The method of claim 1, wherein the active part is set in rotation in the impregnation container by a chain drive.

3. The method of claim 1, wherein the active part is held in the impregnation container by two chains, and further comprising fixing the active part to an active part carrier via the two chains, wherein the active part is set in rotation via at least one of the two chains.

4. The method of claim 1, further comprising preheating the baking oven to a preheating temperature that is lower than the baking temperature prior to introduction of the impregnation container together with the active part into the baking oven.

5. The method of claim 1, further comprising reducing the oven temperature to an end temperature after expiration of the baking period in accordance with a predetermined temperature reduction curve.

6. The method of claim 5, wherein the rotation of the active part is terminated after the oven temperature has reached the end temperature.

7. Apparatus for implementing a method as set forth in claim 1, said apparatus comprising:
- an impregnation container filled with insulating resin for receiving the active part such that the active part is completely submerged in the insulating resin;
- a first chain wheel connectable to the active part;
- an active part carrier configured to hold the active part in the impregnation container and including a second chain wheel which is connectable to the first chain wheel via a chain; and
- a drive operably connected to the second chain wheel to set the active part in rotation about a longitudinal axis thereof.

8. The apparatus of claim 7, further comprising a connecting element configured to connect the first chain wheel to the active part in a detachable manner.

9. The apparatus of claim 7, further comprising a further said first chain wheel connectable to the active part such that the first chain wheel and the further first chain wheel lie on opposite sides of the active part along the longitudinal axis of the active part and fix the active part to the active part carrier via the chain and a further said chain, respectively, for holding the active part in the impregnation container.

10. The apparatus of claim 9, wherein the active part carrier includes a further said second chain wheel which is connectable to the further first chain wheel via the further chain and distanced from the second chain wheel at an adjustable spacing.

11. The apparatus of claim 7, wherein the impregnation container includes a container base having a drainage channel that issues into a container opening, and further comprising a shut-off valve for closing the container opening.

12. The apparatus of claim 7, further comprising a carrier insert having walls, which are arranged in a lattice-like manner, said carrier insert being arranged on the active part carrier in such a manner that the walls protrude into the insulating resin above the active part when the active part is submerged in the insulating resin in the impregnation container.

* * * * *

UNITED STATES PATENT AND TRADEMARK OFFICE
CERTIFICATE OF CORRECTION

PATENT NO. : 11,621,619 B2
APPLICATION NO. : 17/767326
DATED : April 4, 2023
INVENTOR(S) : Matthias Johannes Burghard and Marco Festa It is certified that error appears in the above-identified patent and that said Letters Patent is hereby corrected as shown below:

On the Title Page

(30) Foreign Application Priority Data:
Replace "EP 19202757" with the correct --EP 19202757.1--.

Page 2
(56) References Cited FOREIGN PATENT DOCUMENTS:
Correct "JP 2265907 C2" to read --RU 2265907 C2--.

In the Claims

In Column 6, Claim 1, Line 40 replace "an active pad" with the correct --an active part--.

Signed and Sealed this
Twenty-third Day of May, 2023

Katherine Kelly Vidal
*Director of the United States Patent and Trademark Office*